Nov. 16, 1926.  1,607,292

E. MILLER

GLASSWARE GRINDING MACHINE

Filed Jan. 10, 1925  2 Sheets-Sheet 1

Inventor
EDWARD MILLER his Attorneys

Nov. 16, 1926. 1,607,292
E. MILLER
GLASSWARE GRINDING MACHINE
Filed Jan. 10 1925  2 Sheets-Sheet 2

Inventor
EDWARD MILLER
by *Fincel & Fincel*
his Attorneys

Patented Nov. 16, 1926.

1,607,292

UNITED STATES PATENT OFFICE.

EDWARD MILLER, OF COLUMBUS, OHIO.

GLASSWARE-GRINDING MACHINE.

Application filed January 10, 1925. Serial No. 1,615.

In the manufacture of glass ware and more particularly of tumblers and the like the lip or edge is first ground on a stone and then fused with a hot flame sufficiently to remove the roughness and make round the sharp corners produced by the grinding.

The object of the present invention is to provide an improved machine for grinding such lips or edges, the particular aim of the invention being to afford means whereby the glass is flushed during the grinding operation and subsequently thereby leaving it clean or so as to require little or no washing when finally removed from the machine.
Other objects will appear from the following disclosure.

The invention is embodied in the example herein particularly shown and described, the features of novelty being finally claimed.

In the accompanying drawings—

Figure 4:
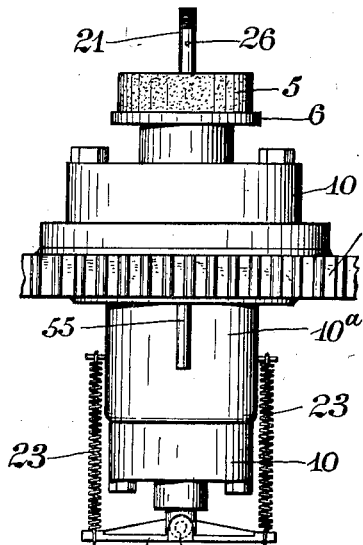
Figure 3:
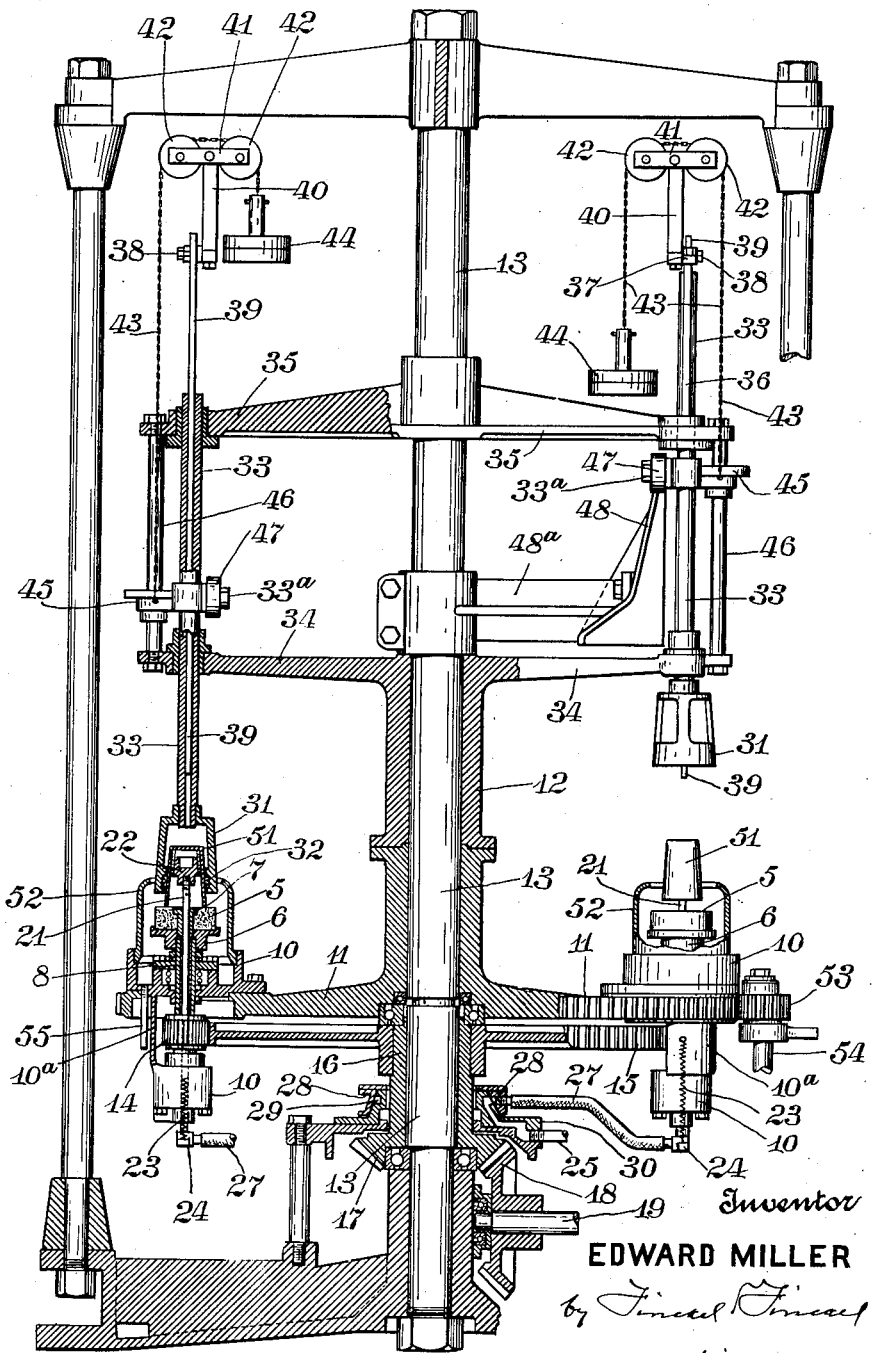
Fig. 3 is a view partly in vertical section showing how a plurality of parts of Figs. 1 and 2 are embodied in a revolving continuously operating mechanism.

Fig. 4 is a detail in elevation looking toward the center of the machine showing the grinding and water supplying elements with the hood removed.

In the views 5 designates the grinding stone which is secured in a head 6 by means of a centrally bored thimble 7 threaded into the head 6. Said head is screwed into the upper end of a vertically arranged tubular spindle 8 supported by suitable bearings at 9 and 9ª in a housing 10. The housing 10 is carried upon a large spur gear table 11 forming a portion of a main frame 12 rotating about a central column 13. The lower portion of the tubular spindle 8 has keyed to it a pinion 14 driven by a large spur gear 15 having a hub 16 journaled on the column 13, said hub having a mitre gear 17 driven by a mitre gear 18 on a suitable power shaft 19. The gearing and power applied are such that the stone may be given, say twenty-four hundred revolutions per minute.

Figure 2:
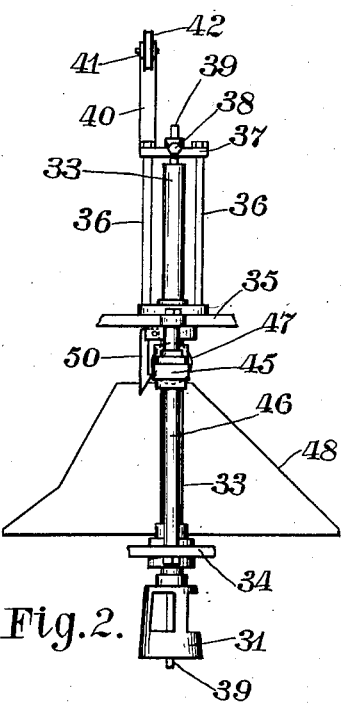
Fig. 2 is a detail partly in section showing the cam means for actuating the ware chuck.
Figure 1:
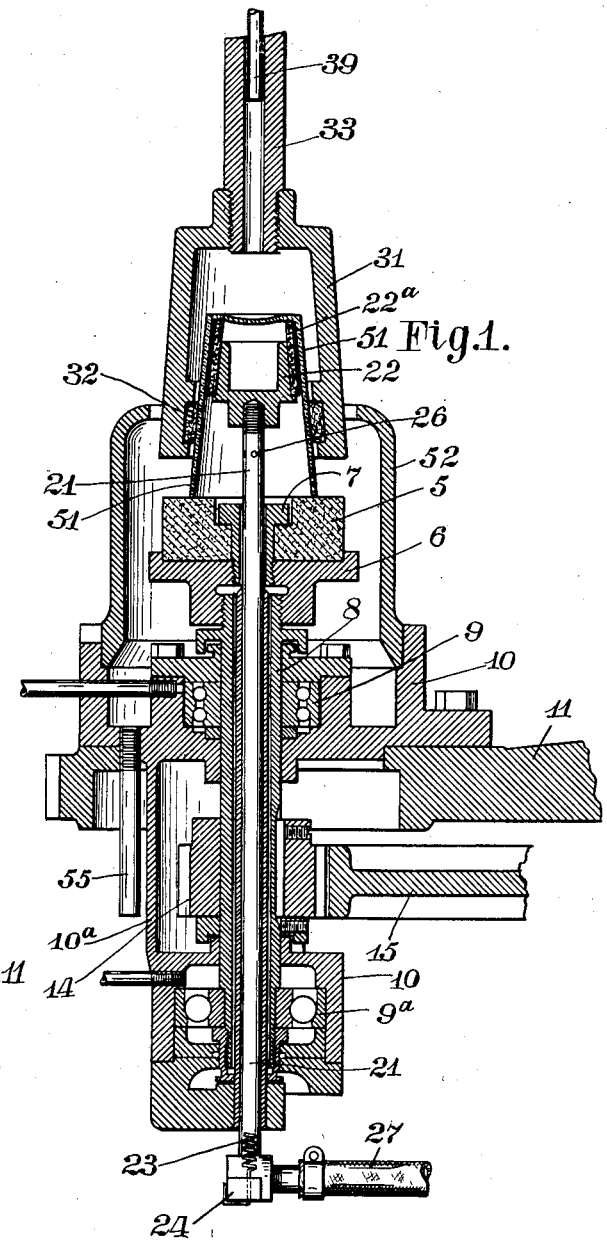
Figure 1 is a vertical sectional view of the ware supporting, grinding elements and the parts actuating the same.

Extending through the rotatable tubular spindle 8 is a pipe 21 threaded at its upper end into a head 22 tapered upward and provided with an annular cushion 22ª preferably of soft rubber. The head 22 with its cushion are made so that the tumbler or piece of ware 51 to be ground rests quite loosely on it. The pipe 21 is non-rotating with respect to the spindle 8 but is yieldingly supported for vertical movement therein by means of springs like that shown at 23 by means of the opposite ends of a cross connected with the opposite ends of the pipe piece 24 fixed to the lower end of the pipe 21 and with an apron 10ª of the housing 10 extending downward from the horizontal portion of the housing. The springs 23 are designed to so far lift the pipe 21 and its head that when the piece of ware 51 is not positively depressed it will be supported somewhat elevated from the contact with the stone as depicted at the right hand side of Fig. 1. The pipe 21 is designed to conduct water to the interior of the ware and to the stone near the lip being ground and for the purpose said pipe is provided with a series of perforations as indicated at 26 near the upper end thereof. Water under suitable pressure is supplied to the pipe 21 by means of a short piece of hose 27 connected with an opening effecting communication with said pipe at the middle of the cross piece 24 and an annular traveling valve 28 inclosing a channel 29 that is primarily fed with water through a stationary pipe 25 in a boss 30 on a stationary ring containing the channel 29.

31 designates a ware chucking member or pressure head provided at its inner side near its rim with an annular seat to receive a band 32 of felt or other material adapted to yieldingly grip the ware. The said chuck member 31 is secured on the lower end of a hollow stem 33 sliding vertically in suitable bushings in the ends of arms 34 and 35 extending outward from the central column 13.

Fixed on the arm 35 is a frame comprised of parallel vertical bars 36, 36, connected at the top by cross head 37; and adjustably fixed to the middle of said cross head by means of a set screw 38 is a rod 39 that extends downward into the stem 33 of the chuck for the ejection of the ware from the chuck when the stem is raised.

Secured to and extending upward from the cross head 37 is an arm 40 having a cross head 41 in the ends of which are journaled pulleys 42 supporting a chain 43 carrying a weight 44 at one end and having its other end connected with a double sleeve 45 attached to the stem 33 by means of a set screw 33ª. The sleeve 45 also engages a guiding rod 46 connected to and between the ends of the arms 34 and 35 said rod standing parallel to the stem 33. The outer end of screw 33ª constitutes a stud shaft on which is journaled a small roller 47 that at proper intervals in the revolution of the grinder about the central column 13 engages a stationary cam 48 supported on stationary arm 48ª thereby automatically causing the elevation of the stem 33 and its chuck 31. The weight 44 should be made to only so far counterbalance the weight of the stem 33 and its chuck as to permit the chuck to exert the proper pressure of the lip or edge of the ware on the stone or grinding member to effect the desired grinding thereof in the time limit fixed and determined by the revolution of the stone about the central column. The pressure of the chucking head can be varied by addition to or subtraction from the counterbalancing weight.

50 designates a pendent hook pivoted on the bushing in the arm 35 and having its hooking end located a little above the point to which the sleeve 45 on the stem is carried upward by the cam 48 so that said hooking end can automatically drop into position to engage the lower side of the sleeve when the stem is raised by hand to support the stem and chuck out of operating position if exigencies require. This hook can be digitally removed to release the stem and chuck whenever desired.

The large spur gear table 11 and the main frame are rotated about the central column 13 by a pinion 53 on the end of a vertical shaft 54 geared to and driven from the power shaft 19 in an obvious manner (not shown).

The operation is this: Assuming that the stone 5 is being spun and the main frame and table 11 are turning on the column 13, the operator places a tumbler 51 on the head 22 while the chuck is in elevated position due to the action of the cam 48. When the roller 47 travels downward off said cam the chuck 31 descends by gravity, engages the tumbler 51 and presses it downward so that its lip or edge is brought into grinding contact with the stone. The grinding action continues while the table and main frame are rotating on the column and until the roller 47 rides up the upwardly inclined edge of the cam. In this operation the elevation of the chuck stem 21 causes contact of the rod 39 with the bottom of the tumbler dislodging it from the chuck 31 the tumbler falling to the head 22 where it receives a renewed cleansing by the spray of water. The cleansed tumbler is then removed by the operator and a fresh one requiring grinding put in its place and the same operation repeated.

The grinding and spraying elements are surrounded by a hood 52 open at its upper end so that the water used and the detritus resulting from the grinding operation are confined to the hood, such water flowing through a suitable pipe 55 to the base of the machine and thence to a waste pipe.

The forms of the parts can be changed without departing from the gist of the invention as claimed.

What I claim is:

1. Means for grinding the lips of hollow ware, including, in combination, a grinding element having a substantially horizontal grinding surface, a water conductor extending upward through the grinding element for spraying the interior of the ware beyond said grinding surface, a ware supporting means connected with the water conductor to engage the interior of the ware in its inverted position and a pressure applying means to engage the exterior of the ware and press the same against the grinding element.

2. Means for grinding the lips of hollow ware, including, in combination, a grinding element having a substantially horizontal grinding surface, a water conductor extending upward through the grinding element for spraying the ware beyond said grinding surface, a ware supporting means to engage the interior of the ware in its inverted position, said ware-supporting means being movable vertically with respect to said grinding surface to remove the ware from the grinding element and a pressure applying means to engage the exterior of the ware and press the same against the grinding element.

3. Means for grinding the lips of hollow ware, including, in combination, a grinding element having a substantially horizontal grinding surface, a water conductor extending upward through the grinding element for spraying the ware beyond said grinding surface, a ware-supporting means to engage the interior of the ware in its inverted position, said ware-supporting means being movable vertically with respect to said grinding surface to remove the ware from the grinding element, yielding means for holding said support in normally elevated position and a pressure applying means to engage the exterior of the ware and press the same against the grinding element.

4. Means for grinding the lips of hollow ware, including, in combination, a grinding element having a substantially horizontal grinding surface, a water conductor for spraying the ware extending through the grinding element upward beyond said grinding surface, a ware supporting means to engage the interior of the ware and a chucking means to engage the exterior of the ware and press the same against the grinding element, said chucking means mounted to slide vertically above the said ware-supporting means and means for ejecting the ware from the chucking means when the chucking means is elevated to permit the ware to return by gravity to the ware-supporting means.

5. Means for grinding the lips of hollow ware, including, in combination, a grinding element having a substantially horizontal grinding surface, a water spraying means for the ware extending through the grinding element upward beyond said grinding surface, a ware supporting means provided with a cushioning member to engage the interior of the ware, and a chucking means to engage the exterior of the ware and press the same against the grinding element, said chucking means mounted to slide vertically above the said ware-supporting means, and means for ejecting the ware from the chucking means when the chucking means is elevated to permit the ware to return by gravity to the ware-supporting means.

6. Means for grinding the lips of hollow ware including, in combination, a grinding element presenting a substantially horizontal grinding surface, means for rotating said element on a vertical axis, a water conductor extending upward through the grinding element beyond said grinding surface and having a discharge in position to flush the wall of the ware and yielding means for engaging the interior of the ware to normally support it in inverted position above said grinding surface and around said ware flushing means, said yielding means adapted to permit the depression of the ware to lip grinding position on said grinding element.

7. Means for grinding the lips of hollow ware including, in combination, a grinding element presenting a substantially horizontal grinding surface, a water conductor extending upward through the grinding element beyond said grinding surface and having a discharge in position to flush the wall of the ware, yielding means for engaging the interior of the ware to normally support it in inverted position above said grinding surface but in position to have its interior surface flushed by said flushing means, a chucking and pressure head to depress the ware to lip grinding position while the ware is being flushed, means for elevating said chucking and pressure head with the ware therein from said supporting and flushing means, and means for ejecting the ware from the chucking and pressure head thereby permitting it to return to said supporting means for reflushing.

8. Means for grinding the lips of hollow ware, including, in combination, a grinding element, means for rotating said element on a vertical axis, a spraying pipe located in said axis, a ware supporting head surmounting said pipe, said pipe and head being vertically movable in said axis, yielding means for holding said head with the ware in elevated position from the grinding element, a chucking and pressure head for engaging said ware to press the lip thereof against the grinding element, said chucking and pressure element operating vertically above said ware supporting head, and means for ejecting the ware from the chucking and pressure head when the latter is elevated from grinding position whereby when the ware is ejected from said chucking and pressure head it returns by gravity to the supporting head.

9. Means for grinding the lips of hollow ware, including, in combination, a grinding element presenting a substantially horizontal grinding surface, a water conductor for spraying the interior of the ware extending upward through the grinding element beyond said grinding surface, a ware supporting means for engaging the interior of the ware in its inverted position above said grinding surface and around said ware-spraying means, and means for yieldingly and normally holding said ware supporting means in a relatively elevated position.

10. Means for grinding the lips of hollow ware including, in combination, a grinding element presenting a substantially horizontally grinding surface, a water conductor having a discharge end standing above said grinding surface with an outlet in position to directly flush the interior of the lateral wall of the ware beyond said grinding element when the ware is placed in inverted position around said discharge end.

11. Means for grinding the lips of hollow ware including, in combination, a grinding element presenting a substantially horizontal grinding surface, a water conductor having a discharge end standing above said grinding surface in position to flush the interior wall of the ware beyond said grinding element when the ware is placed in inverted position around said discharge end and means for yieldingly supporting the ware above said grinding surface and means for exerting grinding pressure between said ware and grinding surface.

12. Means for grinding the lips of hollow ware including, in combination, a grinding element presenting a substantially horizontal grinding surface, a water conductor having a discharge end standing above said grinding surface in position to flush the interior wall of the ware beyond said grinding element when the ware is placed in inverted position around said discharge end, a cushioning means for supporting the ware in elevated position around said discharge end, a ware chucking and pressure exerting device for moving the ware toward the grinding surface, means for elevating the ware chucking and pressure device from said grinding surface and an ejector for releasing the ware from chucked position.

EDWARD MILLER.